United States Patent
Behzadi et al.

(10) Patent No.: US 11,754,681 B2
(45) Date of Patent: Sep. 12, 2023

(54) LIDAR SYSTEM WITH A MULTI-MODE WAVEGUIDE PHOTODETECTOR

(71) Applicant: Aeva, Inc., Mountain View, CA (US)

(72) Inventors: Behsan Behzadi, Sunnyvale, CA (US); Omer P. Kocaoglu, Fremont, CA (US); Keith Gagne, Santa Clara, CA (US); Oguzhan Avci, Cupertino, CA (US); Neal N. Oza, Palo Alto, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 1168 days.

(21) Appl. No.: 16/375,511

(22) Filed: Apr. 4, 2019

(65) Prior Publication Data
US 2020/0319314 A1 Oct. 8, 2020

(51) Int. Cl.
| | |
|---|---|
| *G01S 7/481* | (2006.01) |
| *G01S 7/491* | (2020.01) |
| *G01S 17/32* | (2020.01) |
| *G01S 17/58* | (2006.01) |
| *G01S 17/89* | (2020.01) |
| *G02B 27/30* | (2006.01) |
| *G02B 27/28* | (2006.01) |
| *G01S 17/34* | (2020.01) |
| *G01S 7/4913* | (2020.01) |

(52) U.S. Cl.
CPC .......... *G01S 7/4817* (2013.01); *G01S 7/4811* (2013.01); *G01S 7/4913* (2013.01); *G01S 17/34* (2020.01); *G01S 17/58* (2013.01); *G01S 17/89* (2013.01); *G02B 27/283* (2013.01); *G02B 27/30* (2013.01)

(58) Field of Classification Search
CPC ...... G01S 7/4817; G01S 17/34; G01S 7/4811; G01S 7/4913; G01S 17/58; G01S 17/89; G02B 27/283; G02B 27/30
See application file for complete search history.

(56) References Cited

U.S. PATENT DOCUMENTS

| | | | |
|---|---|---|---|
| 2010/0277714 A1* | 11/2010 | Pedersen | G01S 7/497 356/28 |
| 2013/0209112 A1 | 8/2013 | Witzens | |
| 2017/0108684 A1* | 4/2017 | Fischer | G02B 21/0076 |

(Continued)

FOREIGN PATENT DOCUMENTS

| | | |
|---|---|---|
| DE | 102018116956 A1 | 1/2019 |
| JP | H10-300853 A | 11/1998 |

(Continued)

OTHER PUBLICATIONS

"Sensitivity Improvement of a 1-μm Ladar System Incorporating an Active Optical Fiber Preamplifier", Optical Engineering / Nov. 1993 / vol. 32 No. 11 by Salisbury et al. (Year: 1993).*

(Continued)

*Primary Examiner* — Jamil Ahmed
(74) *Attorney, Agent, or Firm* — Womble Bond Dickinson (US) LLP

(57) ABSTRACT

A light detection and ranging (LIDAR) apparatus is provided that includes an optical source configured to emit an optical beam. The LIDAR apparatus further includes free space optics configured to receive a first portion of the optical beam as a target signal and a second portion of the optical beam as a local oscillator signal, and combine the target signal and the local oscillator signal. The LIDAR apparatus includes a multi-mode (MM) waveguide configured to receive the combined signal.

14 Claims, 9 Drawing Sheets

(56) References Cited

U.S. PATENT DOCUMENTS

2019/0011559 A1  1/2019  Desai et al.
2019/0064358 A1* 2/2019  Desai .................... G01S 7/4911

FOREIGN PATENT DOCUMENTS

| JP | 2009-516215 A | 9/2009 |
|---|---|---|
| SE | 507936 C2 | 7/1998 |
| WO | 2007084209 A2 | 7/2007 |
| WO | 2018003852 A1 | 1/2018 |
| WO | 2018221310 A1 | 4/2020 |

OTHER PUBLICATIONS

International Search Report and Written Opinion dated Jul. 7, 2020 for International Application No. PCT/US2020/023316.
Salisbury et al: "Sensitivity Improvement of a 1-M Ladar System Incorparing an Optical Fiber Preamplifier", Optical Engineering, soc. of Photo-Optical Instrumentation Engineers, Bellingham, vol. 32, No. 11, Nov. 1, 1993, pp. 2671-2680.
Duncan et al: "Performance analysis of a heterodyne lidar system incorporating a multimode optical waveguide receiver", Aerospace and Electronics Conference, 1993. NAECON 1993., Proceedings of the IEEE 1993 National Dayton, OH, USA May 24-28, 1993, New York, NY, IEEE, US, May 24, 1993, pp. 1133-1141.
Transmittal of International Preliminary Report on Patentability dated Oct. 14, 2021, for International Application No. PCT/US2020/023316.
JP Office Action dated Oct. 31, 2022, in related JP application No. 2021-559227, filed Dec. 3, 2021; (pp. 4—incl. Engl. Transl.).

* cited by examiner

LIDAR SYSTEM WITH A MULTI-MODE WAVEGUIDE PHOTODETECTOR

TECHNICAL FIELD

The present disclosure relates generally to light detection and ranging (LIDAR) that provides simultaneous measurement of range and velocity across two dimensions.

BACKGROUND

Fast-scanning mirrors are the primary components used to illuminate a scene in most conventional LIDAR systems. One mirror typically scans quickly along the X direction (azimuth), while another mirror scans slowly along the Y direction (elevation). Light emission and detection from target reflections are done coaxially, typically via a single mode fiber. The collected light has a measured delay or an altered frequency signature that is used to extract range, and potentially velocity, information. A 3D point cloud can be established when the point-wise detected range information is combined with angular position feedback from the scanning mirrors.

To achieve higher frame rates, the mirror's angular velocity is increased, especially that of the scanner in faster scan direction (X scanner in our case). When using the mirrors with a high angular velocity and single-mode fiber-based detection, the target signal from distant objects is severely degraded. Signal degradation is mainly due to the difference in angular position of the scanner mirror from the launch time of the optical signal (pulsed or frequency swept) to the collection time of the same signal from a distant scattering target. This slight angular change causes a walk-off of the target signal at the fiber tip decreasing the coupling efficiency, which manifests itself as a weaker signal detection. Such degradation becomes more severe as the fiber diameter decreases, e.g. a single mode fiber with ~10 µm diameter, or as the mirror's angular velocity increases.

SUMMARY

The present disclosure includes, without limitation, the following example implementations.

Some example implementations provide a light detection and ranging (LIDAR) apparatus including an optical source configured to emit an optical beam. The LIDAR apparatus includes free space optics configured to receive a first portion of the optical beam as a target signal and a second portion of the optical beam as a local oscillator signal and combine the target signal and the local oscillator signal. The LIDAR apparatus may further include a multi-mode (MM) waveguide configured to receive the combined signal.

Some example implementations provide a method including generating, by an optical source of a light detection and ranging (LIDAR) system, an optical beam towards a target. The method includes receiving, by the LIDAR system, a target signal associated with a reflection of the optical beam by the target and a local oscillator signal associated a reflection of the optical beam by free space optics. The method further includes combining the target signal and the local oscillator signal into a multi-mode (MM) waveguide.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Figure 1:
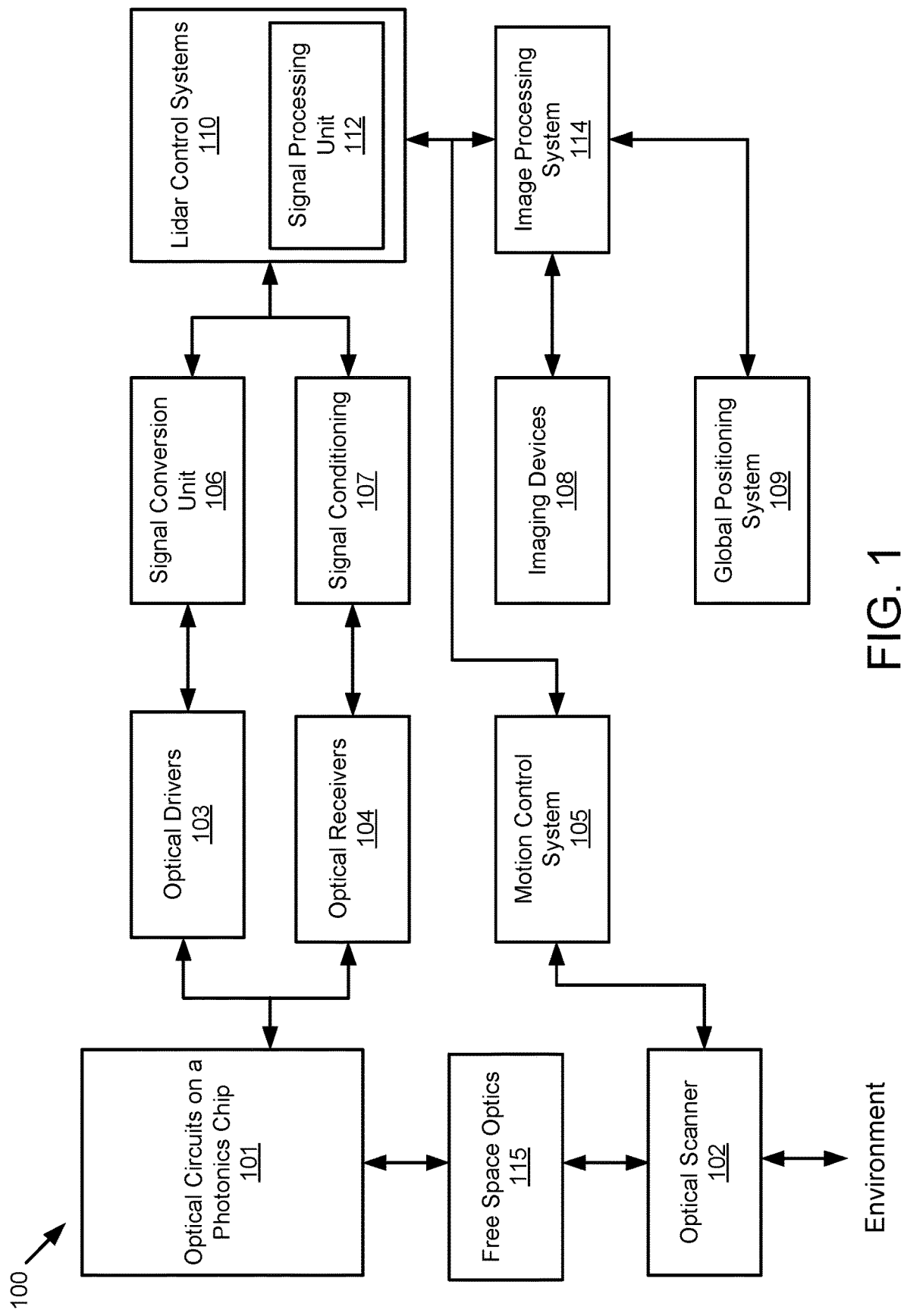
FIG. 1 illustrates a LIDAR system according to example implementations of the present disclosure.

Example implementations of the present disclosure are directed to an improved scanning LIDAR system. Example implementations of the present disclosure are based on a type of LIDAR that uses frequency modulation (FM) and coherent detection to overcome the shortcomings of traditional LIDAR systems and the limitations of prior FM LIDAR systems. Historically, FM LIDAR systems suffer from significant losses in the beam's return path; thus, such systems, which are often quite bulky, require a higher average beam output power to measure distances comparable to time-of-flight (TOF) LIDAR systems. However, the range is limited by the operating distance for eye-safe output powers.

Example implementations of the present disclosure are configured to simultaneously measure the range and velocity, using coherent detection and having the added benefit of immunity to crosstalk from other LIDAR systems. Other implementations may be used with incoherent systems to improve, range, framerate, or detection. Example implementations minimize optical losses in the beam's return path, thereby increasing the system's measurement range. Additionally, by using nondegenerate optical sources, example implementations can leverage mature wavelength division multiplexing (WDM) techniques often used in integrated silicon photonics, a desired platform due to its compactness and relative stability in varying environmental conditions.

As described above, the decenter at the fiber tip upon return of the target signal is the primary source of degradation in coupling efficiency. To mitigate the hampering effect of the decentered return light at the fiber tip, a conventional FM LIDAR system may combine a local oscillator (LO) signal with a target signal into a single-mode (SM) waveguide. The combined signal may then be provided to an optical photodetector. In general, the efficiency of combining the target signal and the LO signal is based on the spatial overlap between the LO signal and the target signal on the photodetector. Since the mode field diameters of SM waveguides are relatively small, coupling the target signal with the SM waveguide is extremely challenging and difficult to manufacture. Furthermore, the SM waveguide does not compensate for time-dependent deleterious effects of coaxial beam scanning, such as insufficient de-scan or signal aberrations.

Example implementations of the present disclosure address the above and other deficiencies by an FM LIDAR system combining the LO signal and target signal and providing the combined signal to a multi-mode (MM) waveguide. The polarization state of light leaving the system can be transformed with a polarization wave plate of free space optics. After the polarization wave plate, a portion of the light can be reflected back toward the system as a LO signal, while the remaining light travels to the environment and may be reflected back by one or more objects within system's field-of-view (FOV) as a target signal. The free space optics may be configured to combine the LO signal and the received target signal to generate a combined signal. In the free space optics, the target signal interferes with the LO signal to form the combined signal. Since the polarization state of the combined signal is transformed, the combined signal can be reflected by a polarization beam splitter to one or more MM waveguides having a larger mode area relative to a SM waveguide. The combined signal can then be provided to one or more waveguide photodetectors (WGPDs).

Accordingly, by providing the combined signal to a MM waveguide, the performance of the FM LIDAR system is improved. Since the MM waveguides have a larger mode area when compared to SM waveguides, coupling the combined signal with the MM waveguide is more efficient when compared to conventional FM LIDAR systems utilizing an SM waveguide, improving the performance and manufacturing capabilities of the FM LIDAR system. Furthermore, using an MM waveguide to receive the combined signal can help compensate for insufficient de-scan effects and aberrations that may be inherent in a coaxial LIDAR system, further improving the performance of the FM LIDAR system.

FIG. 1 illustrates a LIDAR system 100 according to example implementations of the present disclosure. The LIDAR system 100 includes one or more of each of a number of components, but may include fewer or additional components than shown in FIG. 1. The LIDAR system 100 may be implemented in any sensing market, such as, but not limited to, transportation, manufacturing, metrology, medical, and security systems. For example, in the automotive industry, the described beam delivery system becomes the front-end of frequency modulated continuous-wave (FMCW) devices that can assist with spatial awareness for automated driver assist systems, or self-driving vehicles. As shown, the LIDAR system 100 includes optical circuits 101 implemented on a photonics chip. The optical circuits 101 may include a combination of active optical components and passive optical components. Active optical components may generate, amplify, or detect optical signals and the like. In some examples, the active optical circuit includes optical beams at different wavelengths, one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers, splitters/combiners, polarization beam splitters, collimators or the like. In some embodiments, as discussed further below, the free space optics 115 may include components to transform the polarization state and direct received polarized light to optical detectors using a PBS.

An optical scanner 102 includes one or more scanning mirrors that are rotatable along respective orthogonal axes to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanning system may include components such as a quarter-wave plate, lens, anti-reflective coated window or the like.

To control and support the optical circuits 101 and optical scanner 102, the LIDAR system 100 includes a LIDAR control systems 110. The LIDAR control systems 110 may include a processing device for the LIDAR system 100. In embodiments, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some embodiments, the LIDAR control systems 110 may include a signal processing unit 112 such as a digital signal processor. The LIDAR control systems 110 are configured to output digital control signals to control optical drivers 103. In some embodiments, the digital control signals may be converted to analog signals through signal conversion unit 106. For example, the signal conversion unit 106 may include a digital-to-analog converter. The optical drivers 103 may then provide drive signals to active components of optical circuits 101 to drive optical sources such as lasers and amplifiers. In some embodiments, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some embodiments, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical circuit, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment. In some example implementations, the system points multiple modulated optical beams to the same target.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control subsystem. The optical circuits may also include a polarization wave plate to transform the polarization of the light as it leaves the optical circuits 101. In embodiments, the polarization wave plate may be a quarter-wave plate or a half-wave plate. A portion of the polarized light may also be reflected back to the optical circuits 101. For example lensing or collimating systems may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104. Configuration of optical circuits 101 for polarizing and directing beams to the optical receivers 104 are described further below.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometer (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
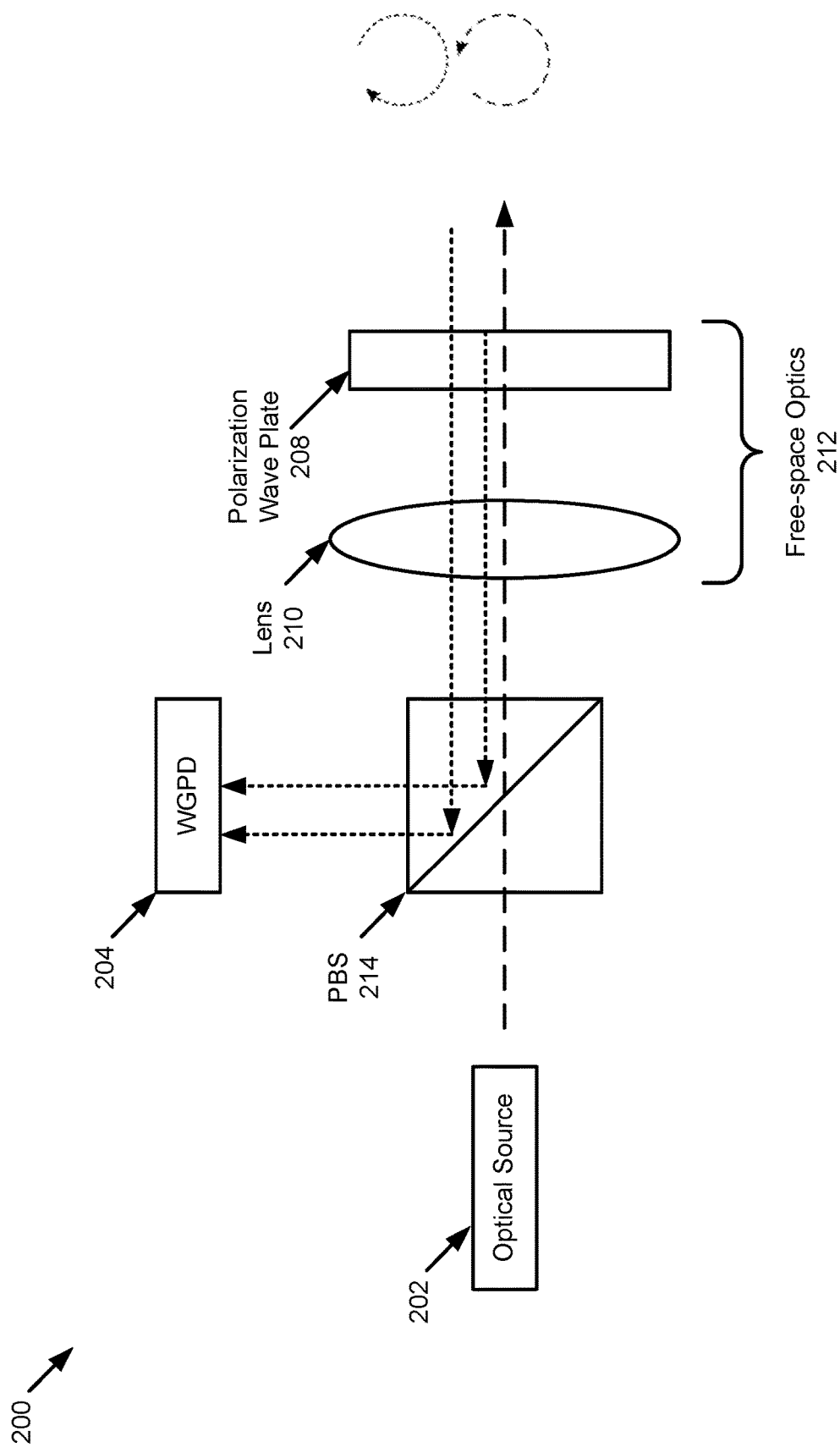
FIG. 2 illustrates aspects of the optical circuits of a scanning system in accordance with embodiments of the present disclosure.

FIG. 2 illustrates aspects of the optical circuits 200 of a scanning system. For example, the optical circuits 200 of FIG. 2 may be part of optical circuits 101 of the LIDAR system 100 as shown with respect to FIG. 1, according to some example implementations. As shown, an optical source 202 is configured to provide an optical beam, such as a laser beam, to passive optical components of a LIDAR system. For example, the optical source 202 may be a laser source. The optical beam may pass through the polarization beam splitter (PBS) 214 as non-polarized light. After passing the PBS 214, the optical beam may enter the free space optics 212. In embodiments, the free space optics 212 may include lens 210 and a polarization wave plate 208. Lens 210 may be used to focus/collimate the light. The polarization of the optical beam can be transformed by use of a polarization wave plate 208. The polarization of the optical beam will then be transformed to a circular polarization. In embodiments, the polarization wave plate 208 may reflect a portion of the polarized light back toward optical source 202. In some embodiments, a separate mirror, micro-lens array, filter, or reflective coating on the lens 210 or polarization wave plate 208 may be used. The reflected portion of the light becomes a local oscillator for interference with returned light from a target.

Although the present illustration shows a particular arrangement of the lens 210 and polarization wave plate 208 of the free space optics 212, in other embodiments lens 210, polarization wave plate 208 and any other components of the free space optics 212 may be arranged in various configurations. For example, the free space optics 212 may be configured such that the optical beam passes through the polarization wave plate 208 to the lens 210. In some embodiments, the lens 210 may also reflect a portion of the polarized light back toward the optical source 202. In some embodiments, the polarization wave plate 208 may be positioned prior to the PBS 214. The tilt angle of the PBS 214 may then be adjusted such that a portion of the optical beam is redirected towards the WGPD 204 as the local oscillator signal.

After passing through the polarization wave plate 208, the optical beam is transmitted to the environment and a portion of the pulse may reflect back from one or more objects. For example, the light may be transmitted to the environment by one or more fast scanning mirrors as discussed with respect to FIG. 1 in a raster pattern. A portion of the reflected light may be returned in the direction of the optical source 202 as a target signal. The free space optics 212 may be configured to combine the received target signal with the local oscillator signal to produce a combined signal that is spatially aligned and co-propagating. Because the combined signal that includes the target signal and the local oscillator signal is polarized, when the combined signal is returned to the polarized beam splitter 206, rather than passing back to the optical source 202, the combined signal is reflected to a waveguide photodetector 204. The local oscillator signal and the signal from the target have interfered to generate the combined signal. Accordingly, there is no need to have the two signals interfere with one another. The combined signal can then be used to interpret distance, velocity, or other factors about the environment at the target point.

Figure 3:
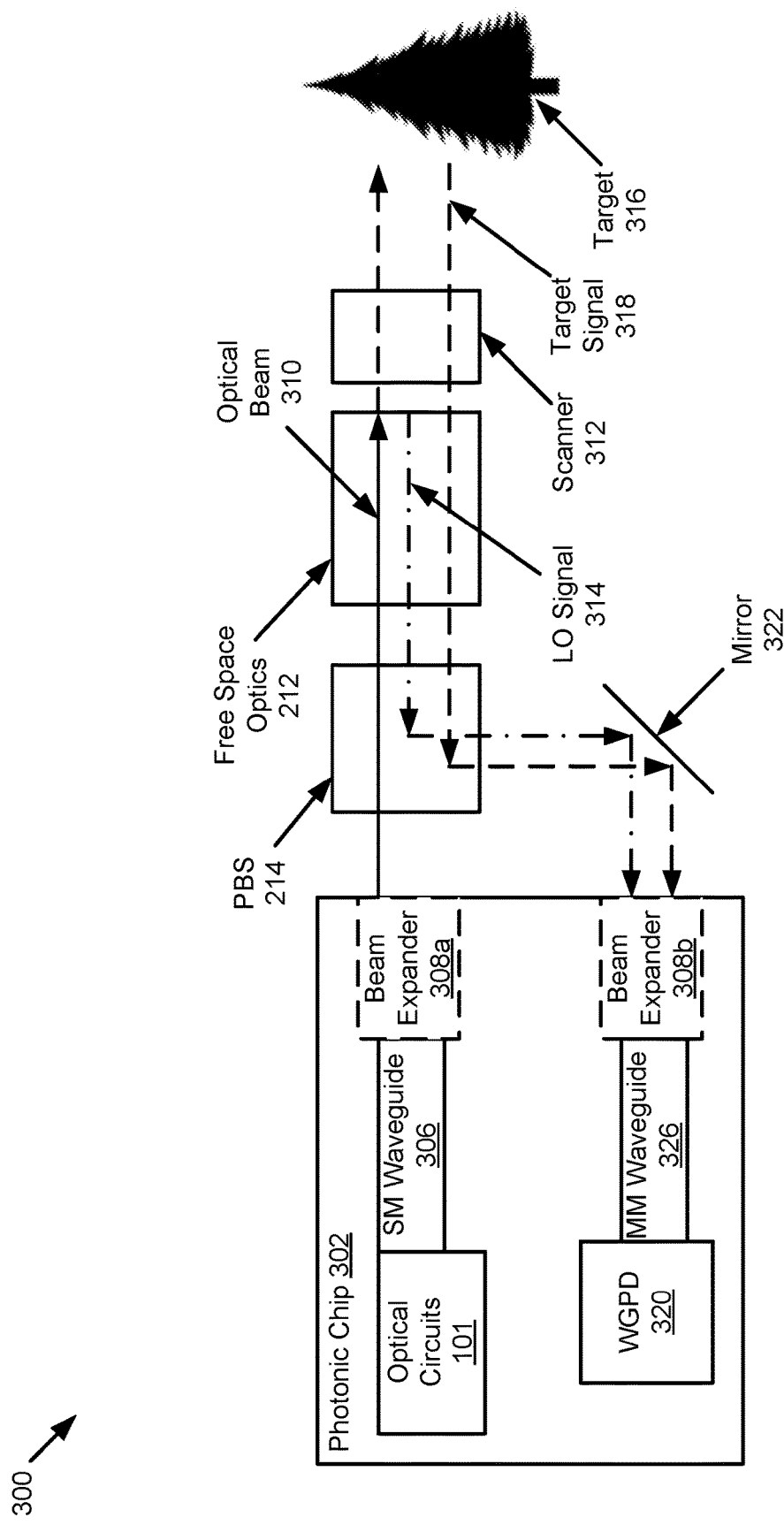
FIG. 3 illustrates aspects of a LIDAR system in accordance with embodiments of the present disclosure.

FIG. 3 illustrates aspects of a LIDAR system 300 in accordance with embodiments of the present disclosure. The LIDAR system 300 may include a photonic chip 302 including one or more components of LIDAR system 300. In embodiments, the optical circuits 101, as previously described at FIG. 1, are implemented on photonic chip 302. Optical circuits 101 may generate an optical beam that is passed through a single-mode waveguide 306 configured for a single-mode propagation of the optical beam. In some embodiments, the optical beam may be provided from the SM waveguide 306 to an optional beam expander 308a that is configured to enlarge the mode area of the optical beam.

Upon exiting the photonic chip 302, the optical beam may pass through a polarization beam splitter (PBS) 214, as previously described. In embodiments, a lens (not shown) may be positioned between the photonic chip 302 and the PBS 214 to collimate the optical beam prior to entering the PBS 214. The LIDAR system 300 may further include free space optics 212 to transform the polarization of the light, reflect a portion of the light as a local oscillator signal 314, combine the target signal and local oscillator signal, etc., as previously described at FIG. 2.

Upon transforming the polarization of the light, a portion of the optical beam may be transmitted towards a target 316 via a scanner 312 (e.g., optical scanner 102 of FIG. 1). When the optical beam hits the target 316, a portion of the beam is returned back to the LIDAR system 300 as a target signal 318. The target signal 318 is received by the free space optics 212 where target signal 318 is combined with the local oscillator signal 314, as previously described. The combined signal is then received by PBS 214 and redirected towards a multi-mode (MM) waveguide 326. In embodiments, the combined signal may be redirected from the PBS 214 to the MM waveguide 326 via one or more fold mirrors 316. In some embodiments, prior to entering the MM waveguide 326, the combined signal may be passed through an optional beam expander 308b to enlarge the mode area of the combined signal. The combined signal may then pass through the MM waveguide 326 where the combined signal is received by a waveguide photodetector (WGPD) 320. The combined signal can then be used to interpret distance, velocity, or other factors about the environment at the target point.

Figure 4:
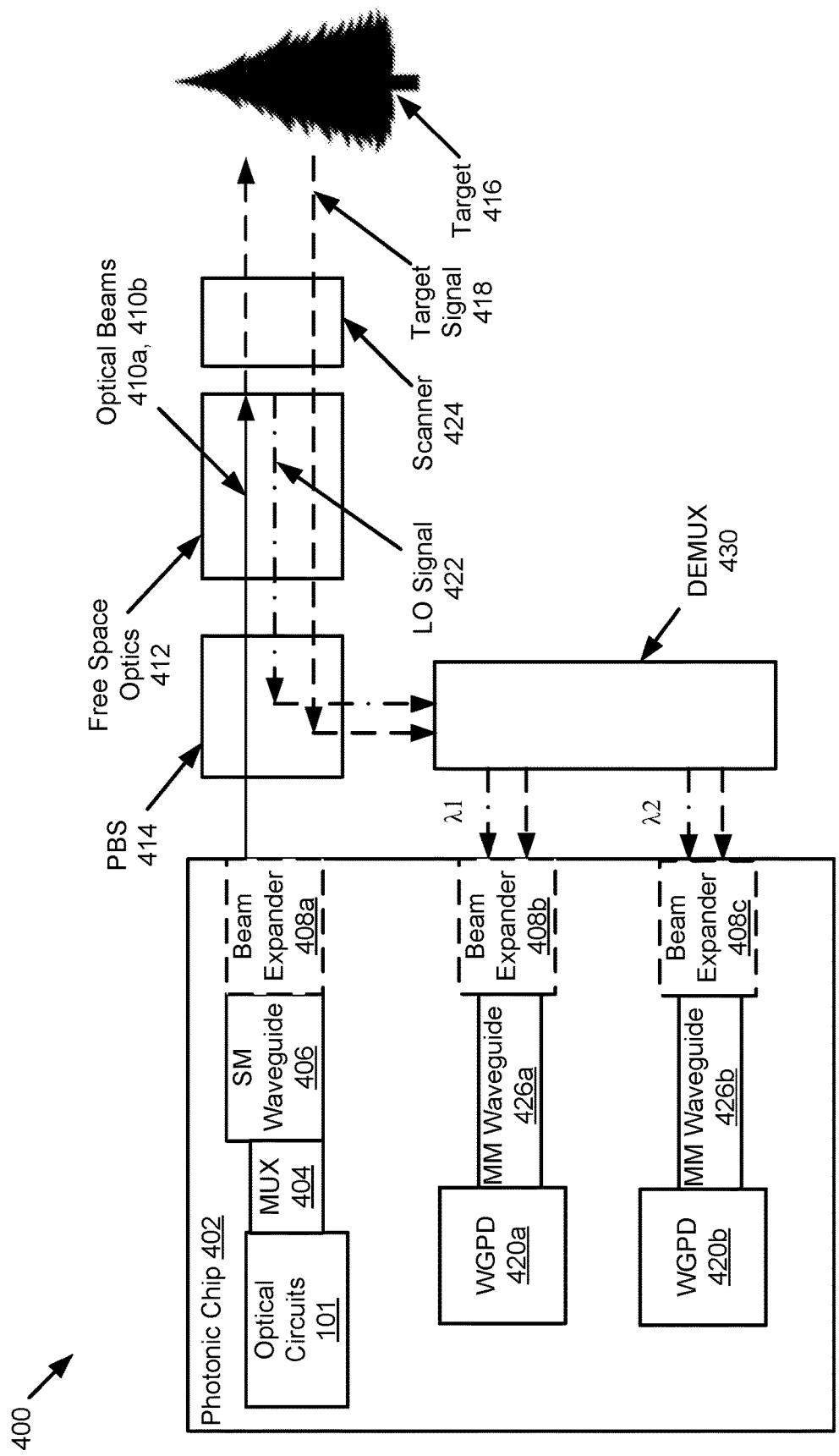
FIG. 4 illustrates aspects of a LIDAR system having multiple optical sources in accordance with embodiments of the present disclosure.

FIG. 4 illustrates aspects of a LIDAR system 400 having multiple optical sources in accordance with embodiments of the present disclosure. The LIDAR system 400 may include a photonic chip 402 including one or more components of LIDAR system 400. In embodiments, the photonic chip 402 may include optical circuits 101 as previously described at FIG. 1. Optical circuits 101 may include multiple optical sources that generate optical beams. In embodiments, a first optical beam may have a first wavelength (e.g., λ1) and a second optical beam may have a second wavelength (e.g., λ2). Upon generating the optical beams, the optical beams may be multiplexed together by multiplexer (MUX) 404 into a single output beam. The multiplexed optical beam may be passed through a single-mode waveguide 406 configured for a single-mode propagation of the optical beam. In some embodiments, the optical beam may be provided to a beam expander 408a that is configured to enlarge the mode area of the optical beam.

Upon exiting the photonic chip 402, the optical beams may pass through a polarization beam splitter (PBS) 414, as previously described. In embodiments, a lens (not shown) may be positioned between the photonic chip 402 and the PBS 414 to collimate the optical beams prior to entering the PBS 414. The LIDAR system 400 may further include free space optics 412 to transform the polarization of the optical beams, reflect a portion of the light as a local oscillator signal 422, combine the target signal 418 and local oscillator signal 422, etc., as previously described at FIG. 2.

Upon transforming the polarization of the light, a portion of the optical beam may be transmitted towards a target 416 via a scanner 424 (e.g., optical scanner 102 of FIG. 1). When the optical beam hits the target 416, a portion of the beam is returned back to the LIDAR system 400 as a target signal 418. The target signal 418 is received by the free space optics 412 where target signal 418 is combined with the local oscillator signal 422. The combined signal is then received by PBS 414 and redirected towards a demultiplexer (DEMUX) 430. The DEMUX 430 may be configured to receive the optical beam and redirect a first portion of the optical beam to a first location and a second portion of the optical beam to a second location based on wavelength. For example, DEMUX 430 may redirect a first portion of the optical beam having wavelength λ1 to a first location and a second portion of the optical beam having wavelength λ2 to a second location. Further details regarding DEMUX 430 are described below at FIGS. 5A and 5B.

A first combined signal that includes a first LO signal and a first target signal having wavelength λ1 may be redirected by DEMUX 430 towards a first MM waveguide 426a. In some embodiments, prior to entering the first MM waveguide 426a, the first combined signal may be passed through a beam expander 408b configured to enlarge the mode area of the first combined signal. The first combined signal may then pass through the first MM waveguide 426a where the combined signal is received by a first waveguide photodetector (WGPD) 420a.

A second combined signal that includes a second LO signal and a second target signal having wavelength $\lambda 2$ may be redirected by DEMUX 430 towards a second MM waveguide 426b. In some embodiments, prior to entering the second MM waveguide 426a, the second combined signal may be passed through a beam expander 408c configured to enlarge the mode area of the second combined signal. The second combined signal may then pass through the second MM waveguide 426b where the combined signal is received by a second waveguide photodetector (WGPD) 420b.

Figure 5A:
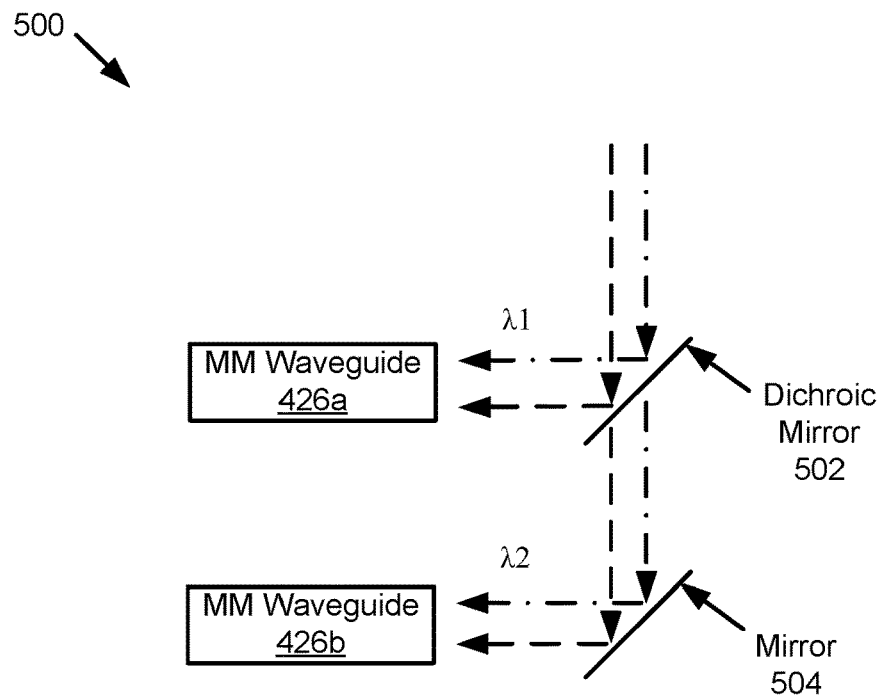
FIG. 5A is an illustration of an example demultiplexer in accordance with embodiments of the present disclosure.

FIG. 5A is an illustration of an example demultiplexer 500 in accordance with embodiments of the present disclosure. In embodiments, demultiplexer (DEMUX) 500 may correspond to DEMUX 430 of FIG. 4. DEMUX 500 may include a dichroic mirror 502 and a fold mirror 504.

The dichroic mirror 502 may be configured to reflect/redirect optical beams of a particular wavelength, while allowing optical beams of a different wavelength to pass through the dichroic mirror 502. For example, dichroic mirror 502 may be configured to redirect optical beams having a wavelength of $\lambda 1$, while allowing optical beams having a wavelength of $\lambda 2$ to pass through the dichroic mirror 502. Referring to FIG. 5A, dichroic mirror 502 is configured to redirect optical beams having a wavelength of $\lambda 1$ while allowing optical beams having a wavelength of $\lambda 2$ to pass through the dichroic mirror 502. Accordingly, a first portion of the combined signal including the first LO signal and the first target signal having a wavelength of $\lambda 1$ is redirected into MM waveguide 426a, as previously described at FIG. 4.

A second portion of the combined signal including the second LO signal and second target signal having a wavelength of $\lambda 2$ passes through the dichroic mirror 502, where the second portion of the combined signal is redirected by fold mirror 504 into MM waveguide 426b, as previously described at FIG. 4.

Figure 5B:
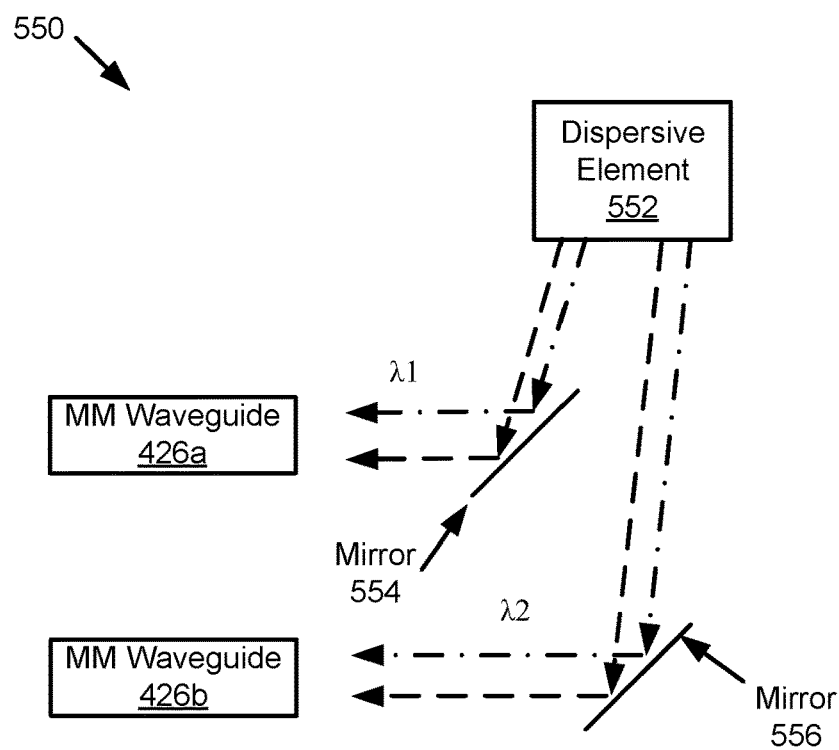
FIG. 5B is an illustration of an example demultiplexer in accordance with some embodiments of the present disclosure.

FIG. 5B is an illustration of an example demultiplexer 550 in accordance with some embodiments of the present disclosure. In embodiments, demultiplexer (DEMUX) 550 may correspond to DEMUX 430 of FIG. 4. DEMUX 550 may include a dispersive element 552 and fold mirrors 554 and 556.

The dispersive element 552 may be formed of one or more materials that are configured to disperse portions of the optical beam at different angles based on the wavelength of the optical beam. For example, dispersive element 552 may be configured to direct a first portion of an optical beam having a wavelength of $\lambda 1$ at a first angle and a second portion of the optical beam having a wavelength of $\lambda 2$ at a second angle. Referring to FIG. 5B, the dispersive element 552 is configured to direct a first portion of the optical beam having a wavelength of $\lambda 1$ at a first angle towards fold mirror 554 and direct a second portion of the optical beam having a wavelength of $\lambda 2$ at a second angle towards fold mirror 556. Fold mirror 554 may be configured to redirect the first portion of the optical beam into a first MM waveguide 426a and fold mirror 556 may be configured to redirect the second portion of the optical beam into a second MM waveguide 426b.

Accordingly, a first portion of the combined signal including the first LO signal and the first target signal having a wavelength of $\lambda 1$ is redirected by dispersive element 552 to fold mirror 554 and into MM waveguide 426a. A second portion of the combined signal including the second LO signal and second target signal having a wavelength of $\lambda 2$ is redirected by dispersive element 552 to fold mirror 556 and into MM waveguide 426b, as previously described at FIG. 4.

Figure 6:
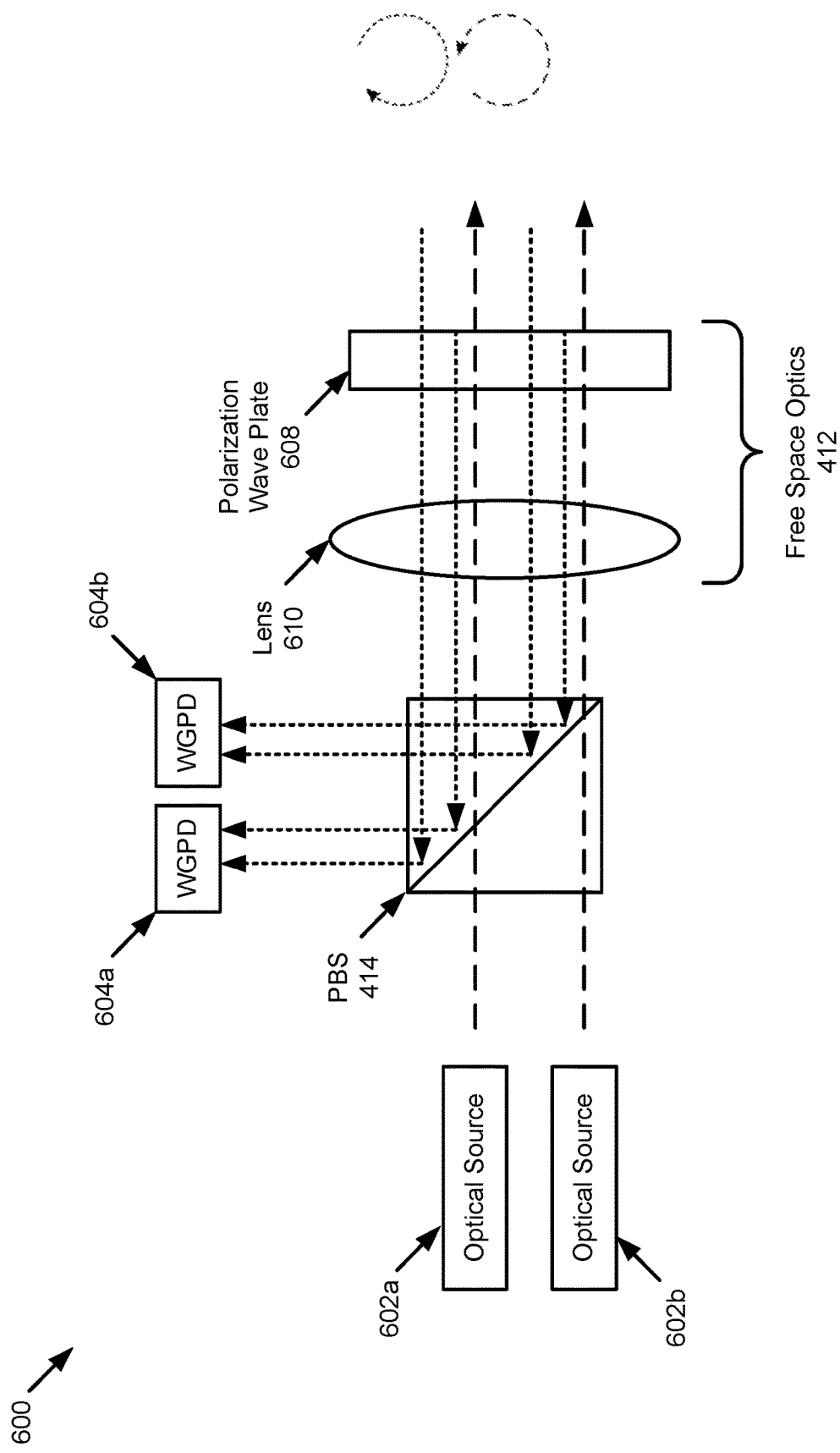
FIG. 6 illustrates aspects of the optical circuits of a scanning system.

FIG. 6 illustrates aspects of the optical circuits 600 of a scanning system. For example, the optical circuits 600 of FIG. 6 may be part of optical circuits 101 of the LIDAR system 100 as shown with respect to FIG. 1, according to some example implementations. As shown, optical circuits 600 include multiple optical sources 602a, 602b and multiple WGPDs 604a, 604b. The multiple optical sources 602a, 602b and WGPDs 604a, 604b may provide multiple data points during a single time interval. Accordingly, fewer rotations of the fast scanning mirrors may provide additional data. The remaining portions of the optical circuits 600 may be the same or similar to those described above with reference to FIG. 2. For example, the optical circuits 600 may include free space optics 412 having a polarization wave plate 608 to transform the polarization of light, lens 610 to collimate the light, and the like. In some embodiments, the alignment of the PBS 414 may be set such that the optical sources 602a, 602b and WGPDs 604a, 604b are aligned when returned light is reflected. In some embodiments, there may be multiple optical sources 602a, 602b, multiple WGPDs 604a, 604b, and also multiple PBSs 414. The signals received at each of the WGPDs 604a, 604b may be analyzed separately to generate distance or velocity data at a point. In some embodiments, the optical sources 602a, 602b may provide optical beams at different wavelengths.

Figure 7A:
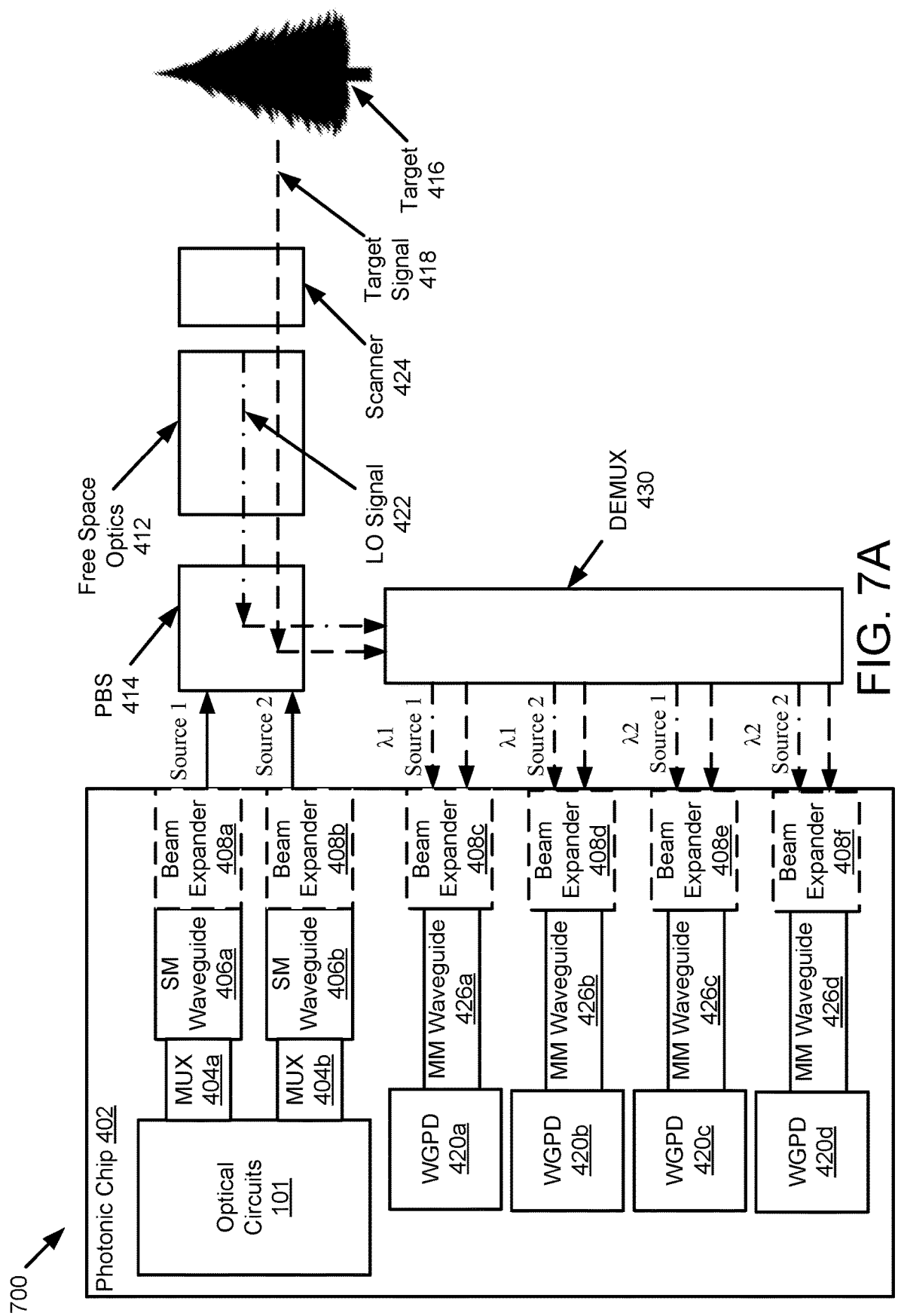
FIG. 7A illustrates aspects of a LIDAR system having multiple optical sources generating multiple optical beams in accordance with embodiments of the present disclosure.

FIG. 7A illustrates aspects of a LIDAR system 700 having multiple optical sources generating multiple optical beams in accordance with embodiments of the present disclosure. The components of LIDAR system 700 may be similar to the components of LIDAR system 400. However, rather than having two optical sources that each generate one optical beam, the two optical sources each generate two optical beams. For example, a first optical source may generate a first optical beam having a first wavelength and a second optical beam having a second wavelength. Similarly, a second optical source may generate a third optical beam having a third wavelength and a fourth optical beam having a fourth wavelength.

The optical beams generated by the first optical source may be multiplexed together by MUX 404a and the optical beams generated by the second optical source may be multiplexed together by MUX 404b. The multiplexed beam from the first optical source (e.g., Source 1) and the multiplexed beam from the second optical source (e.g., Source 2) are then directed towards target 416, as previously described. A target signal 418 is received and combined with LO signal 422. The combined signal is redirected towards DEMUX 430 by PBS 414. The DEMUX 430 is configured to separate the combined signal based on wavelength and optical source. For example, the DEMUX 430 may separate a first portion of the combined signal that corresponds to a first wavelength (e.g., $\lambda 1$) from the first optical source (e.g., Source 1) and direct the first portion of the combined signal towards MM waveguide 426a. DEMUX 430 may separate a second portion of the combined signal that corresponds to the first wavelength from the second optical source and direct the second portion of the combined signal towards MM waveguide 426b. DEMUX 430 may further separate a third portion of the combined signal that corresponds to a second wavelength (e.g., $\lambda 2$) from the first optical source and direct the third portion of the combined signal towards MM waveguide 426c. DEMUX 430 may also separate a fourth portion of the combined signal that correspond to the second wavelength from the second optical source and direct the fourth portion of the combined signal towards MM waveguide 426d.

Although described as having two optical sources generating multiple optical beams, embodiments of the disclosure may utilize any number of laser sources generating multiple optical beams of differing wavelengths. For example, aspects of the disclosure may be utilized by a LIDAR system having a single optical source that generates two or more optical beams of differing wavelengths.

Figure 7B:
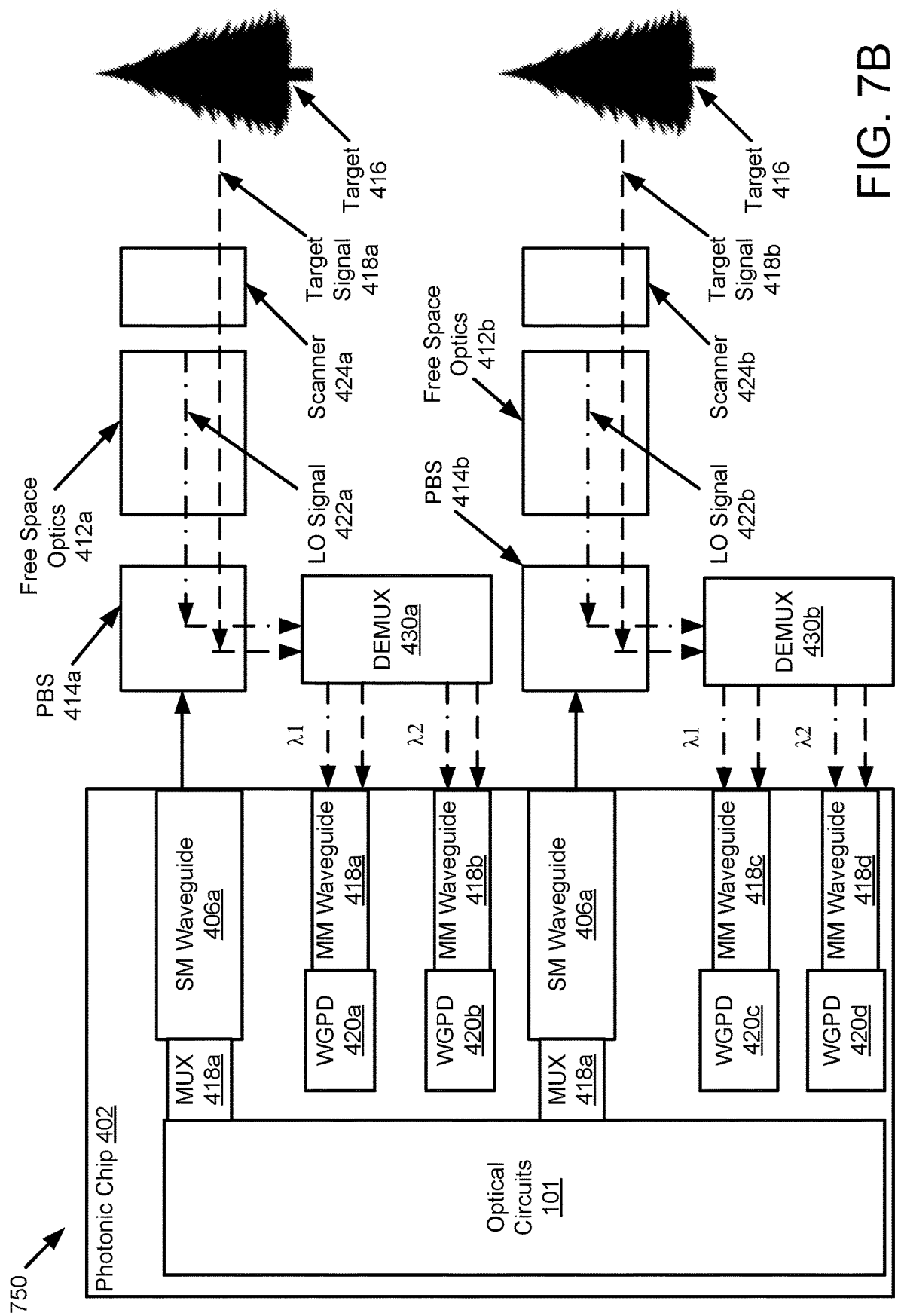
FIG. 7B illustrates aspects of a LIDAR system having multiple optical sources generating multiple optical beams in accordance with other embodiments of the present disclosure.

FIG. 7B illustrates aspects of a LIDAR system 750 having multiple optical sources generating multiple optical beams in accordance with other embodiments of the present disclosure. The components of LIDAR system 750 may be similar to the components of LIDAR system 700. However, rather than having one set of passive optical circuits utilized by the multiple optical sources, in FIG. 7B each of the optical sources may have a corresponding set of passive optical circuits. For example, a first optical source may have a corresponding PBS 414a, free space optics 412a and scanner 424a and a second optical source may have a corresponding PBS 414b, free space optics 412b and scanned 424b. Similarly, each of the optical sources may have a corresponding DEMUX (e.g., DEMUX 430a and 430b) that separates a received combined signal based on wavelength, as previously described at FIGS. 4-5. For clarity, optional beam expanders are not shown prior to MM waveguides 426a-d. However, in some embodiments, beam expanders may be positioned on photonic chip 402 prior to MM waveguides 426a-d.

Although described as having two optical sources generating multiple optical beams, embodiments of the disclosure may utilize any number of laser sources generating multiple optical beams of differing wavelengths. For example, aspects of the disclosure may be utilized by a LIDAR system having a single optical source that generates two or more optical beams of differing wavelengths.

Figure 8:
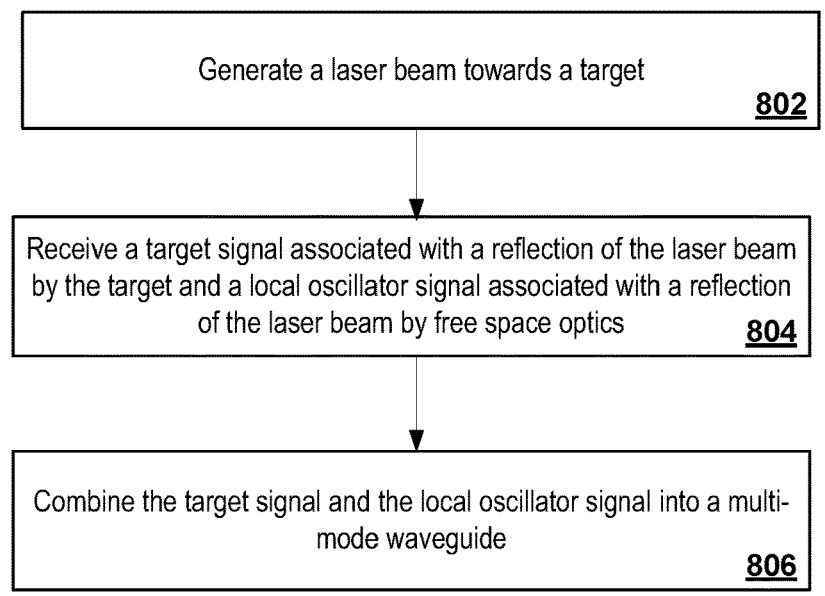
FIG. 8 depicts a flow diagram of a method for combining a target signal and a local oscillator signal into a multi-mode waveguide in accordance with implementations of the present disclosure.

FIG. 8 depicts a flow diagram of a method 800 for combining a target signal and a local oscillator signal into a multi-mode waveguide in accordance with implementations of the present disclosure. In embodiments, various portions of method 800 may be performed by LIDAR systems 100, 300 and/or 400 of FIGS. 1, 3 and 4 respectively.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

At block 802, an optical source of the LIDAR system generates an optical beam towards a target. In embodiments, multiple optical sources may generate multiple optical beams. In some embodiments, the multiple optical beams may have different wavelengths. The generated optical beam may pass through a PBS and free space optics towards a target, as previously described. In embodiments, the polarization of the one or more optical beams may be transformed by a polarization wave plate.

At block 804, the LIDAR system receives a target signal associated with a reflection of the optical beam by the target. The LIDAR system may also receive a local oscillator signal associated with a reflection of the optical beam by free space optics, as previously described at FIGS. 2 and 6. In embodiments, multiple target signals and multiple local oscillator signals generated by multiple optical sources may be received by the LIDAR system.

At block 806, the LIDAR system combines the target signal and the local oscillator signal into a multi-mode (MM) waveguide. In embodiments, free space optics of the LIDAR system may be configured to combine the target signal and the local oscillator signal such that the signals are spatially aligned and co-propogating. The combined signal may be redirected towards the MM waveguide by a PBS and/or one or more fold mirrors. In embodiments, the combined signal may then be provided to a waveguide photodetector via the MM waveguide. In some embodiments, the waveguide photodetector and the MM waveguide may reside on the same photonic chip.

In embodiments utilizing multiple optical sources to generate multiple optical beams, a DEMUX may be utilized to direct a first combined signal having a first wavelength into a first MM waveguide and a second combined signal having a second wavelength into a second MM waveguide. In some embodiments, the DEMUX may include a dichroic mirror and a fold mirror, as previously described at FIG. 5A. In an embodiment, the DEMUX may include a dispersive element and one or more fold mirrors, as previously described at FIG. 6B.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) apparatus, comprising:
   an optical source configured to emit an optical beam;
   a polarization wave plate configured to transform a polarization state of the optical beam;
   a lens configured to collimate the optical beam;
   free space optics configured to:
      receive a first portion of the optical beam as a target signal;
      receive a second portion of the optical beam from the polarization wave plate as a local oscillator signal, wherein the polarization wave plate comprises a reflector or a coating to return the second portion of the optical beam; and
      combine the target signal and the local oscillator signal;
   a set of multi-mode (MM) waveguides; and
   a demultiplexer comprising a dispersive element, the demultiplexer configured to:
   disperse, via the dispersive element, each respective wavelength of the combined signal at a corresponding angle; and
   reflect each respective wavelength of the combined signal to a corresponding MM waveguide of the set of MM waveguides.

2. The LIDAR apparatus of claim 1, further comprising:
   a polarization beam splitter configured to pass a first polarization state of light through the beam splitter in a first direction and reflect a second polarization state of light in a second direction different than the first direction.

3. The LIDAR apparatus of claim 2, further comprising:
   second lensing optics configured to collimate the optical beam through the polarization beam splitter.

4. The LIDAR apparatus of claim 1, further comprising:
   a set of waveguide photodetectors, each waveguide photodetector of the set of waveguide photodetectors configured to receive the combined signal from a respective MM waveguide.

5. The LIDAR apparatus of claim 4, wherein the optical source, the set of waveguide photodetectors and the set of MM waveguides are positioned on a photonic chip.

6. The LIDAR apparatus of claim 1, wherein the polarization wave plate comprises a quarter-wave plate or a half-wave plate.

7. The LIDAR apparatus of claim 1, further comprising:
   a multiplexer to multiplex a set of component optical beams into the optical beam, wherein each of the set of component optical beams has a respective wavelength that corresponds to a respective wavelength of the combined signal.

8. The LIDAR apparatus of claim 7, wherein the demultiplexer further comprises:
   a set of mirrors, each of the set of mirrors positioned at the corresponding angle of a respective wavelength of the combined signal and configured to reflect the respective wavelength of the combined signal to the corresponding MM waveguide.

9. A method comprising:
   generating, by an optical source of a light detection and ranging (LIDAR) system, an optical beam towards a target;
   transforming, by a polarization wave plate, a polarization state of the optical beam;
   collimating the optical beam;
   receiving, by free space optics of the LIDAR system, a first portion of the optical beam as a target signal;
   receiving a second portion of the optical beam from the polarization wave plate as a local oscillator signal;
   combining the target signal and the local oscillator signal into a combined signal; and
   dispersing, via a dispersive element of a demultiplexer, each respective wavelength of the combined signal at a corresponding angle; and
   reflecting, via the demultiplexer, each respective wavelength of the combined signal to a corresponding MM waveguide of a set of MM waveguides.

10. The method of claim 9, further comprising:
    receiving, at each of a set of waveguide photodetectors, a respective wavelength of the combined signal from a respective MM waveguide.

11. The method of claim 10, wherein the LIDAR system, the set of MM waveguides and the set of waveguide photodetectors are on a photonic chip.

12. The method of claim 9, further comprising:
    multiplexing a set of component optical beams into the optical beam, wherein each of the set of component optical beams has a respective wavelength that corresponds to a respective wavelength of the combined signal.

13. The method of claim 12, wherein reflecting each respective wavelength of the combined signal to a corresponding MM waveguide comprises:
    reflecting, via each of a set of mirrors of the demultiplexer, a respective wavelength of the combined signal to the corresponding MM waveguide.

14. The method of claim 12, wherein reflecting a respective wavelength of the combined signal to a corresponding MM waveguide comprises:
    directing a first wavelength of the combined signal towards a first mirror; and
    directing a second wavelength of the combined signal towards to second mirror.

* * * * *